US011943740B2

(12) United States Patent
Taherzadeh Boroujeni et al.

(10) Patent No.: US 11,943,740 B2
(45) Date of Patent: Mar. 26, 2024

(54) METHODS AND APPARATUS FOR REPETITION OF PAGING AND PAGING DCI

(71) Applicant: QUALCOMM Incorporated, San Diego, CA (US)

(72) Inventors: Mahmoud Taherzadeh Boroujeni, San Diego, CA (US); Tao Luo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 184 days.

(21) Appl. No.: 17/337,117

(22) Filed: Jun. 2, 2021

(65) Prior Publication Data

US 2021/0410104 A1 Dec. 30, 2021

Related U.S. Application Data

(60) Provisional application No. 63/044,952, filed on Jun. 26, 2020.

(51) Int. Cl.
*H04W 68/00* (2009.01)
*H04W 68/02* (2009.01)
*H04W 72/0446* (2023.01)
*H04W 72/23* (2023.01)
*H04W 72/30* (2023.01)

(52) U.S. Cl.
CPC ......... *H04W 68/005* (2013.01); *H04W 68/02* (2013.01); *H04W 72/0446* (2013.01); *H04W 72/23* (2023.01); *H04W 72/30* (2023.01)

(58) Field of Classification Search
None
See application file for complete search history.

(56) References Cited

U.S. PATENT DOCUMENTS

| | | | | |
|---|---|---|---|---|
| 10,129,877 B2* | 11/2018 | Rico Alvarino | ...... | H04W 76/11 |
| 11,678,297 B2* | 6/2023 | Lee | ......... | H04W 72/23 |
| | | | | 370/312 |
| 2017/0273078 A1* | 9/2017 | Rico Alvarino | ...... | H04W 76/11 |

(Continued)

FOREIGN PATENT DOCUMENTS

| | | | | |
|---|---|---|---|---|
| WO | WO-2018028500 A1 * | 2/2018 | | |
| WO | WO-2019099661 A1 * | 5/2019 | ............... | H04B 7/00 |
| WO | WO-2020032532 A1 * | 2/2020 | | |

*Primary Examiner* — Jay L Vogel
(74) *Attorney, Agent, or Firm* — Procopio, Cory, Hargreaves & Savitch LLP

(57) ABSTRACT

The present disclosure relates to methods and devices for wireless communication including an apparatus, e.g., a user equipment (UE) and/or base station. In one aspect, the apparatus may monitor for a paging physical downlink control channel (PDCCH) and a paging message. The apparatus may also receive the paging PDCCH including paging downlink control information (DCI), where the paging DCI is associated with the paging message. The apparatus may also receive the paging message, where at least one of the paging DCI or the paging message is received more than once. In another aspect, the apparatus may transmit a paging PDCCH including paging DCI, where the paging DCI is associated with a paging message. The apparatus may also transmit the paging message, where at least one of the paging DCI or the paging message is transmitted more than once.

23 Claims, 11 Drawing Sheets

(56) References Cited

U.S. PATENT DOCUMENTS

| | | | |
|---|---|---|---|
| 2018/0026698 A1* | 1/2018 | Lee | H04B 7/2125 |
| | | | 370/335 |
| 2020/0404617 A1* | 12/2020 | Murray | H04B 7/0695 |
| 2021/0045060 A1* | 2/2021 | Sui | H04W 72/20 |
| 2021/0153189 A1* | 5/2021 | Jo | H04B 7/15542 |
| 2021/0185652 A1* | 6/2021 | Rune | H04L 5/0078 |
| 2021/0235252 A1* | 7/2021 | Shikari | H04W 72/23 |

* cited by examiner

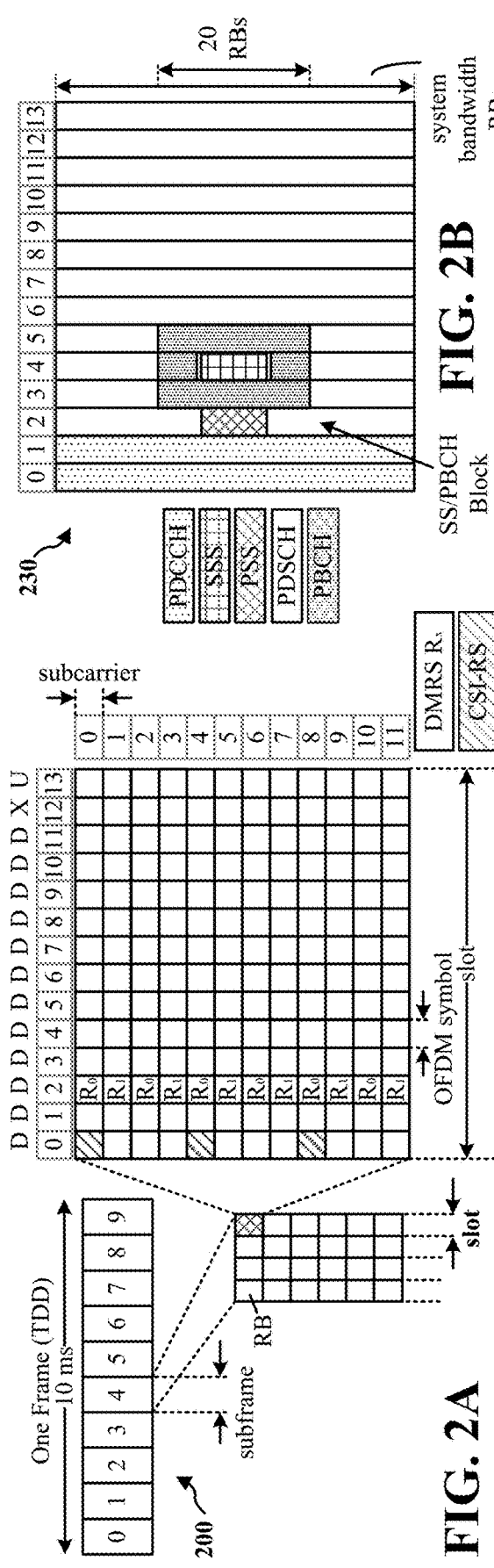
FIG. 2A
FIG. 2B
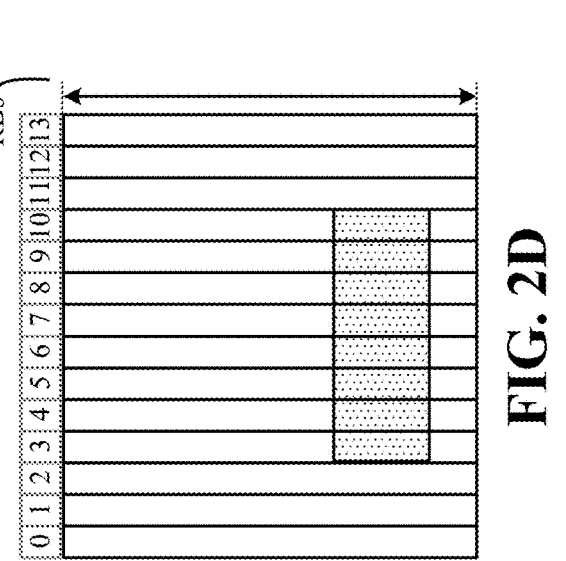
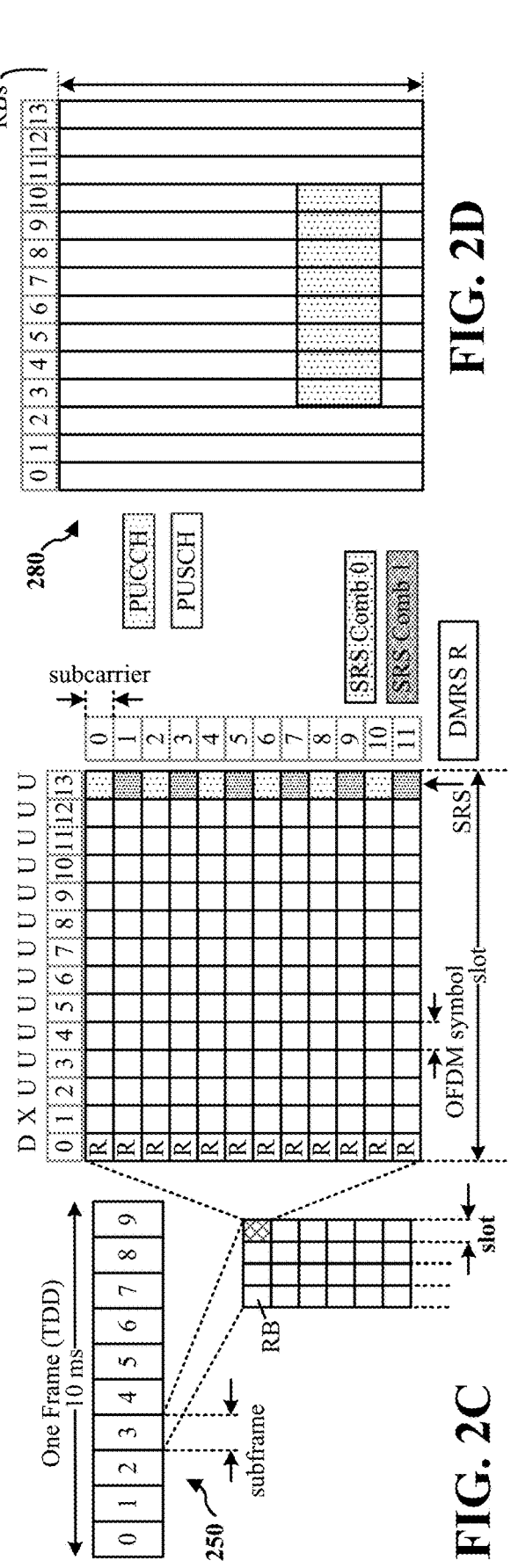
FIG. 2C
FIG. 2D

METHODS AND APPARATUS FOR REPETITION OF PAGING AND PAGING DCI

CROSS REFERENCE TO RELATED APPLICATION(S)

This application claims the benefit of U.S. Provisional Application Ser. No. 63/044,952, entitled "METHODS AND APPARATUS FOR REPETITION OF PAGING AND PAGING DCI" and filed on Jun. 26, 2020, which is expressly incorporated by reference herein in its entirety.

TECHNICAL FIELD

The present disclosure relates generally to communication systems, and more particularly, to paging in wireless communication systems.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may monitor for a physical broadcast channel (PBCH), the PBCH indicating at least one of the repetition of the paging DCI or the repetition of the paging message. The apparatus may also receive the PBCH, where the PBCH indicates a paging control resource set (CORESET) configuration. The apparatus may also receive remaining minimum system information (RMSI) or other system information (OSI). Additionally, the apparatus may monitor for a paging physical downlink control channel (PDCCH) and a paging message. The apparatus may also receive the paging PDCCH including paging downlink control information (DCI), where the paging DCI is associated with the paging message. Moreover, the apparatus may decode the paging DCI, where the decoded paging DCI schedules the paging message. The apparatus may also receive the paging message, where at least one of the paging DCI or the paging message is received more than once.

In another aspect of the disclosure, a method, a computer-readable medium, and an apparatus are provided. The apparatus may be a base station. The apparatus may transmit a physical broadcast channel (PBCH), the PBCH indicating at least one of the repetition of the paging DCI or the repetition of the paging message. The apparatus may also transmit remaining minimum system information (RMSI) or other system information (OSI). Further, the apparatus may encode paging DCI, where the encoded paging DCI schedules the paging message. The apparatus may also transmit a paging physical downlink control channel (PDCCH) including paging downlink control information (DCI), where the paging DCI is associated with a paging message. The apparatus may also transmit the paging message, where at least one of the paging DCI or the paging message is transmitted more than once.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
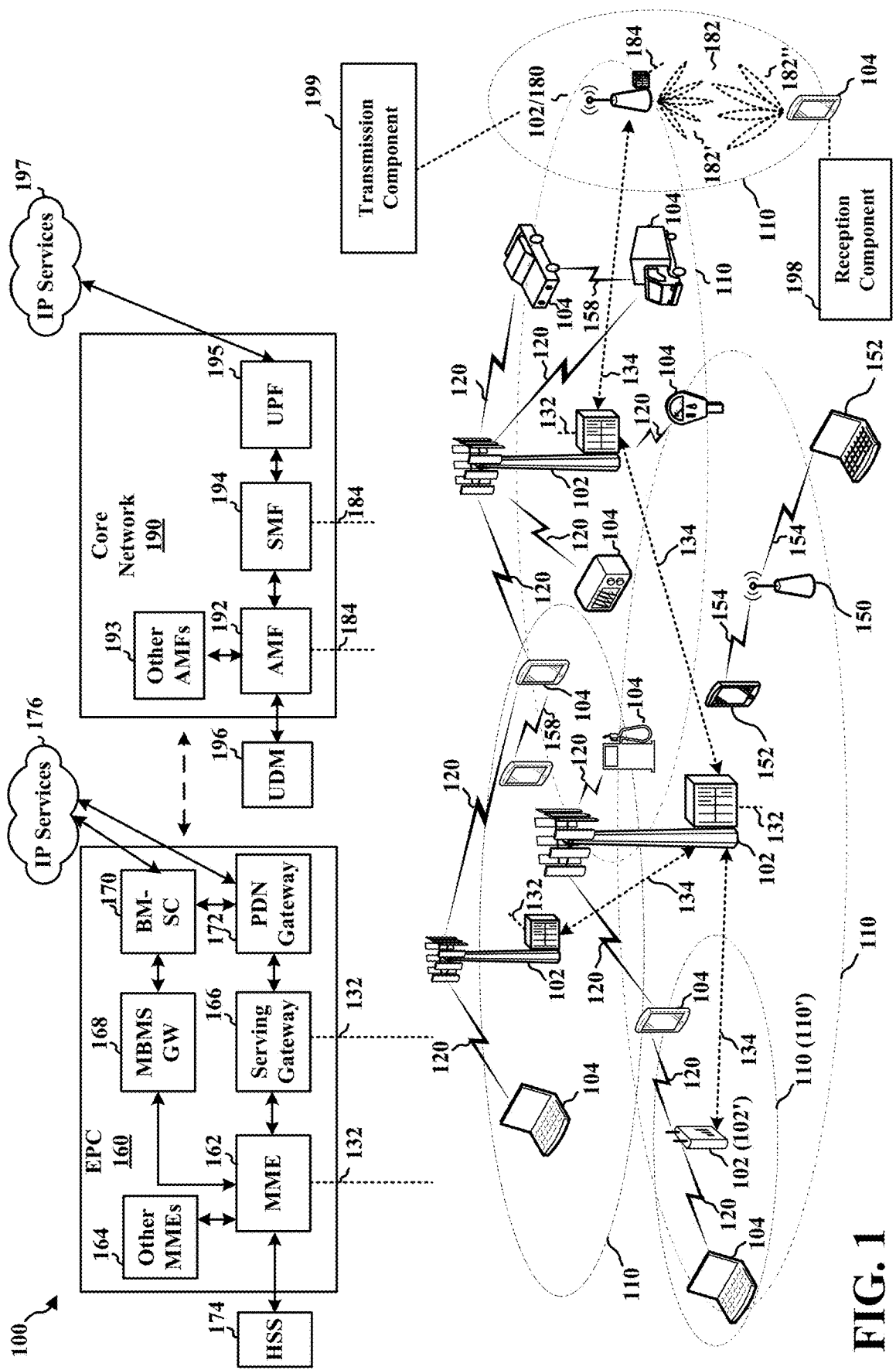
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provide s bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet switched (P S) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a reception component 198 configured to monitor for a physical broadcast channel (PBCH), the PBCH indicating at least one of the repetition of the paging DCI or the repetition of the paging message. Reception component 198 may also be configured to receive the PBCH, where the PBCH indicates a paging control resource set (CORESET) configuration. Reception component 198 may also be configured to receive remaining minimum system information (RMSI) or other system information (OSI). Reception component 198 may also be configured to monitor for a paging physical downlink control channel (PDCCH) and a paging message. Reception component 198 may also be configured to receive the paging PDCCH including paging downlink control information (DCI), where the paging DCI is associated with the paging message. Reception component 198 may also be configured to decode the paging DCI, where the decoded paging DCI schedules the paging message. Reception component 198 may also be configured to receive the paging message, where at least one of the paging DCI or the paging message is received more than once.

Referring again to FIG. 1, in certain aspects, the base station 180 may include a transmission component 199 configured to transmit a physical broadcast channel (PBCH), the PBCH indicating at least one of the repetition of the paging DCI or the repetition of the paging message. Transmission component 199 may also be configured to transmit remaining minimum system information (RMSI) or other system information (OSI). Transmission component 199 may also be configured to encode paging DCI, where the encoded paging DCI schedules the paging message. Transmission component 199 may also be configured to transmit a paging physical downlink control channel (PDCCH) including paging downlink control information (DCI), where the paging DCI is associated with a paging message. Transmission component 199 may also be configured to transmit the paging message, where at least one of the paging DCI or the paging message is transmitted more than once.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
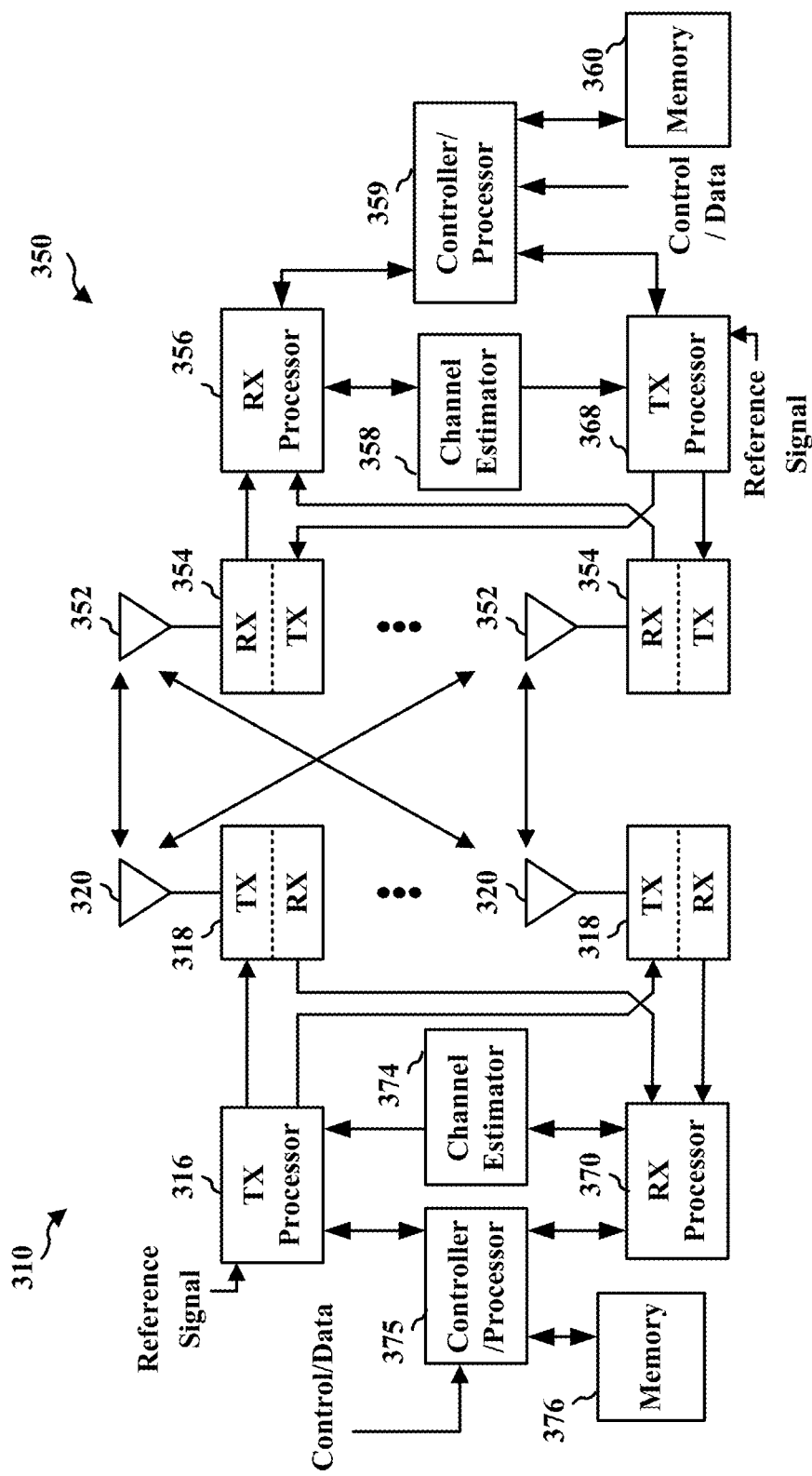
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate a radio frequency (RF) carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium which may store computer executable code for wireless communication of a user equipment (UE), the code when executed by a processor (e.g., one or more of RX processor 356, TX processor 368, and/or controller/processor 359) instructs the processor to perform aspects of FIGS. 9, 10, and/or 11. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium which may store computer executable code for wireless communication of base station, the code when executed by a processor (e.g., one or more of RX processor 370, TX processor 316, and/or controller/processor 375) instructs the processor to perform aspects of FIGS. 9, 10, and/or 11. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Some aspects of wireless communications, e.g., 5G new radio (NR), utilize paging communication, which may limit the coverage of certain transmissions, e.g., millimeter wave (mmW) transmissions. Also, the transmission of paging may be similar to other broadcast channels for mmW transmissions. One reason for the limited coverage of paging is that a base station may use wide broadcast beams, which may be similar to synchronization signal block (SSB) beams. So the base station may use wide SSB beams that may not have large gains, which may make the coverage inadequate. Unicast beams may be more narrow and refined compared to other beams, as unicast beams may be used for direct communication between a base station and a UE. However, for broadcast channels, the base station uses SSB beams that are wider and may have less coverage compared to other beams, e.g., unicast beams.

In some instances, the base station may transmit or broadcast SSB beams. The SSB beams may include a physical broadcast channel (PBCH), which carries system information. The PBCH may inform the UE where the control information is located for remaining minimum system information (RMSI) or other system information (OSI). The PBCH may also indicate a control resource set (CORESET) configuration for RMSI and paging communication.

Additionally, a physical downlink control channel (PDCCH) may be transmitted by the base station, which may schedule the RMSI. The RMSI may contain additional system information, which may contain information about paging occasions, time offsets, periodicity, and/or search space configuration. Also, the RMSI or OSI may contain information regarding monitoring occasions for paging. In some aspects, monitoring occasions may be indicated by RMSI, but the scheduling may be performed by the paging PDCCH. In some instances, the paging PDCCH and the paging may be in the same slot. And each slot may be an amount of symbols, e.g., 14 symbols. Also, a CORESET may be used for the PDCCH scheduling.

A variety of paging parameters may be explicitly signaled in the corresponding RMSI or OSI. For instance, a paging occasion configuration, e.g., time offset, duration, periodicity, may be signaled in RMSI or OSI. A PDCCH configuration may provide a search space configuration including monitoring occasions within the paging occasion. For paging CORESET configurations, the same configuration may be reused for an RMSI CORESET, e.g., as indicated in the PBCH. Also, the paging CORESET may schedule the paging.

In some aspects, a transmission of a paging DCI, e.g., via a paging PDCCH, may be followed by a transmission of a paging message. Further, paging DCI may be the content that is transmitted by the PDCCH. In some instances, paging DCI and a paging message may be sent in the same slot. Additionally, a UE grouping may be utilized, where the UE is configured of its paging occasions per slot. Short paging messages, e.g., systemInfoModification, cmas-Indication, and etws-Indication messages, may be transmitted in the paging DCI.

Moreover, a UE may assume quasi co-location (QCL) between SSBs, paging DCIs, and paging messages. So paging DCIs and paging messages may be transmitted using the same beams as SSBs. When the UE receives one SSB, it may follow the same beam for the paging DCIs and paging messages. In some aspects, a UE may not combine multiple paging DCIs within one paging occasion (PO). So there may be a single paging DCI or a paging message in a paging PDCCH.

Based on the above, it may be beneficial to improve the coverage of paging. As such, it may be beneficial to include the repetition of paging DCI and/or paging messages. So it may be beneficial to combine multiple paging DCIs within one paging occasion (PO), such that there is repetition of paging DCIs and a corresponding increase in paging coverage.

Aspects of the present disclosure may improve the coverage of paging DCIs and/or paging messages. For instance, aspects of the present disclosure may include the repetition of paging DCI and/or the repetition of paging messages. For example, the present disclosure may combine multiple paging DCIs within one paging occasion (PO), such that there is repetition of paging DCIs and a corresponding increase in paging coverage.

In some aspects, the base station may schedule and transmit repeated paging DCI and/or repeated paging messages. Scheduling of the repeated paging PDCCH and/or paging messages and/or its corresponding resources may be implicitly indicated by a PBCH. As indicated above, the PBCH may include the CORESET configuration for the RMSI and paging.

Scheduling of paging PDCCH repetition may be indicated by an alternative interpretation of some bit fields (bitfields) or tables in a PBCH that are used for configuration of a CORESET, e.g., CORESET0. For instance, legacy UEs may use a previous interpretation of the CORESET, e.g., CORESET0, as well as a configuration of bitfields or tables. For these bitfields, it may be indicated that there is paging DCI or paging repetition. For instance, a new column may be added to the configuration tables of PDCCH monitoring occasions for a certain search space, e.g., Type0-PDCCH common search space, to indicate a paging PDCCH repetition. For example, SS or PBCH block and a control resource set may include a certain multiplexing pattern, e.g., multiplexing pattern 1, and frequency range, e.g., frequency range 2. The resources and parameters of the repetition may be dependent on the parameters of the search space, e.g., Type0-PDCCH common search space.

Further, additional details may be indicated based on a separate table in a specification, or based on a corresponding RMSI or OSI configuration. So extra information in the bitfields or tables in the PDCCH may indicate that there is a repetition of the paging DCI or paging message. The location of the repetition may be indicated via additional bitfields or tables. Also, the additional information may be transmitted over the corresponding RMSI. So UEs may interpret new information from these bitfields or tables, such as by adding rows or columns to the bitfields or tables.

In some aspects, because legacy UEs may use the tables, the tables may not be altered. Newer UEs may interpret new information from the same tables, in addition to old information in the tables. Based on these bitfields, the new UEs may receive the configuration of a CORESET, e.g., CORESET0, and based on the new details that are added for these tables, the new UEs may interpret that for a certain selection of the bitfields, the UEs may also include repetition of the paging DCI or paging message. For certain CORESET configurations, the UEs may interpret paging repetitions based on added information in a bitfield or table, as well as added information in the RMSI or OSI.

In some instances, scheduling of repeated paging PDCCH and/or a paging message and its corresponding resources may be indicated by its corresponding RMSI or OSI. Additionally, PDCCH monitoring aggregation may be indicated in the search space configuration of the paging PDCCH in the corresponding RMSI or OSI. The paging monitoring aggregation may also be indicated in the paging occasion configuration in the corresponding RMSI or OSI. So the RMSI may indicate the amount of paging repetitions and the location of the paging repetitions.

The PBCH may indicate the configuration of a CORESET, and the RMSI may indicate all of the information regarding the paging repetitions and/or the location of the paging repetitions. So there may be added information in the RMSI that may also indicate the details for paging repetition. As indicated above, the repeated paging may be implicitly indicated by the PBCH. In some instances, the content of the PBCH may not change, so the indication may be implicit. For instance, additional columns in tables or bitfields may correspond to additional interpretation. The repeated paging may also be explicitly indicated by the RMSI or OSI. In some instances, an order of transmission from a base station to a UE may be as follows: PBCH, RMSI PDCCH (which may be a small amount of control information that schedules the RMSI), RMSI, paging PDCCH, and paging message.

As indicated herein, the repetition of paging may be indicated by paging DCI. Repetition numbers for paging DCI and paging messages may be different. For example, the base station may configure a number of repetitions, e.g., four repetitions, via monitoring aggregation for paging DCI and two repetitions for a paging message. The set of slots containing paging DCI repetitions may include one slot that has both paging DCI and paging. This slot may be used by some UEs to monitor paging. Also, this slot may be the last slot among the slots that contain copies of paging DCI and the first slot among the slots that contain copies of a paging message.

Figure 4:
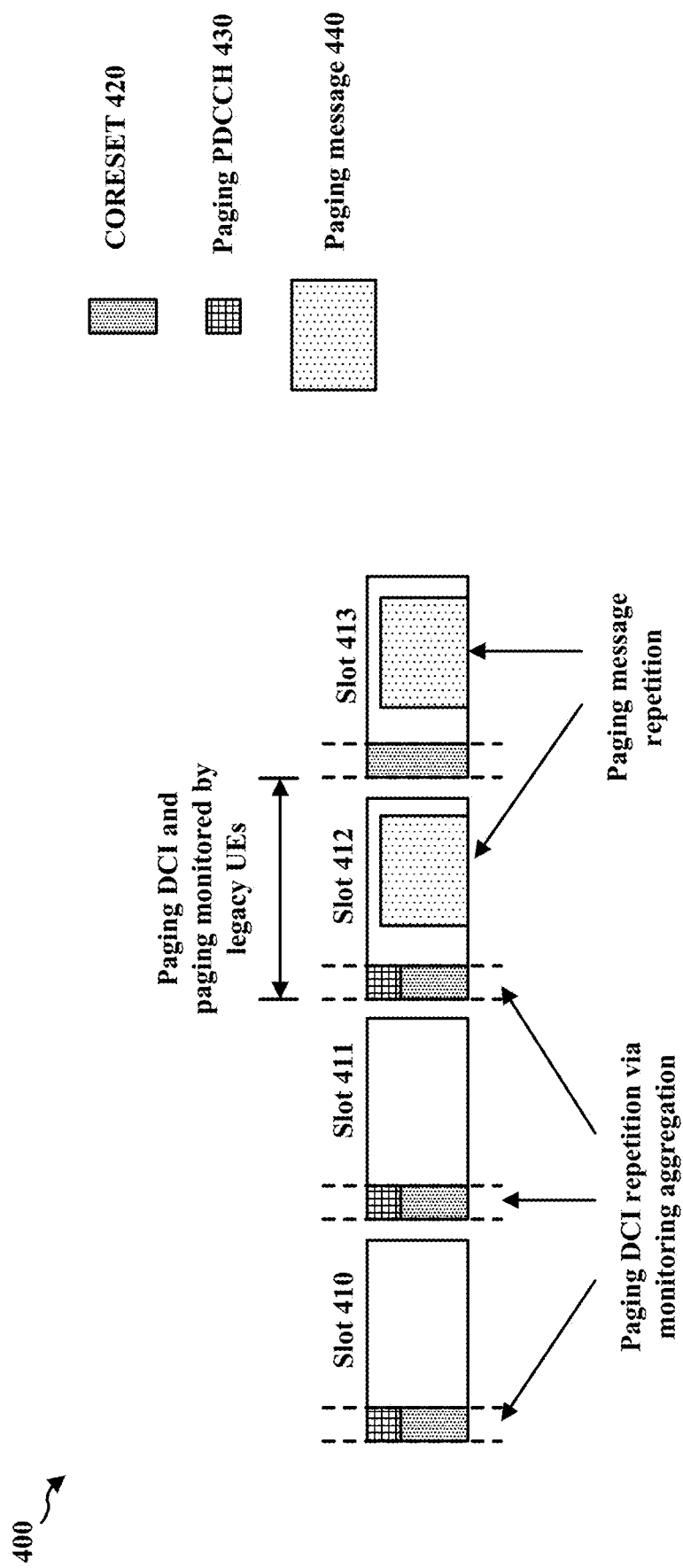
FIG. 4 is a diagram illustrating example paging communication in accordance with one or more techniques of the present disclosure.

FIG. 4 is a diagram 400 illustrating example paging communication in accordance with one or more techniques of the present disclosure. As shown in FIG. 4, diagram 400 includes a number of slots, e.g., slot 410, slot 411, slot 412, and slot 413, CORESET 420, paging PDCCH 430, and paging message 440. FIG. 4 displays that the paging DCI may be repeated via monitoring aggregation. Also, the paging DCI and the paging message 440 may be monitored by some UEs, e.g., legacy UEs. Further, there may be a repetition of paging message 440.

As shown in slots 410 and 411, the paging DCI is transmitted over the paging PDCCH 430 within the CORESET 420. Accordingly, the CORESET 420 and the paging PDCCH 430 may be transmitted in the same slots. Also, the paging message 440 may be scheduled in the same slot 410. As shown in slots 412 and 413, aspects of the present disclosure may also include repetitions of paging DCI and repetitions of paging message 440.

In some aspects, repetitions of paging DCI or a paging message may be indicated via a PBCH. Also, repetitions of paging DCI or a paging message may be indicated by RMSI or OSI. Further, repetitions of paging DCI may be indicated via RMSI, and repetitions of paging may be indicated by paging DCI, as paging DCI may schedule the paging message. In some instances, a set of slots including the paging DCI repetition may include at least one slot that includes both the paging DCI repetition and the paging message repetition.

Figure 5:
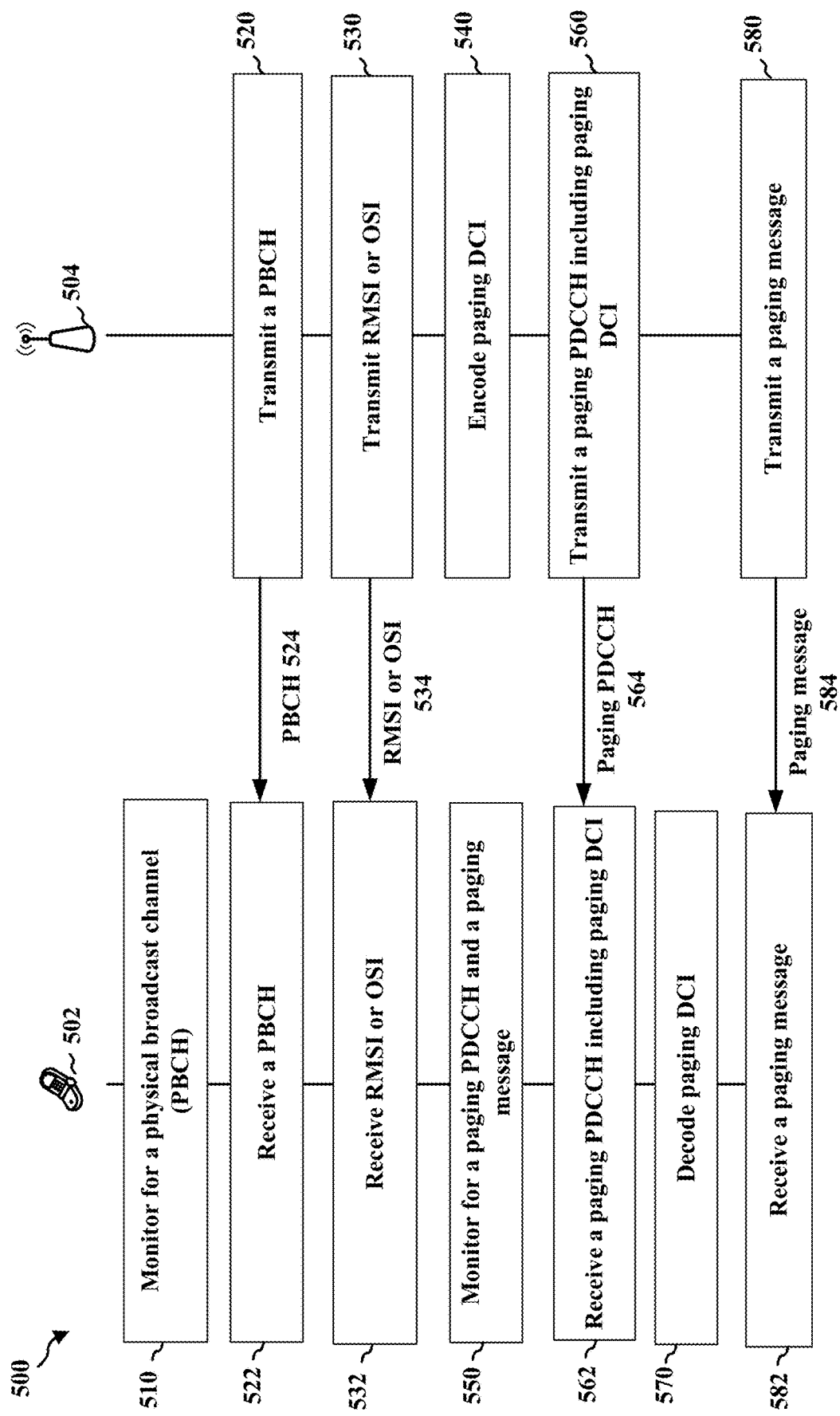
FIG. 5 is a diagram illustrating example communication between a UE and a base station in accordance with one or more techniques of the present disclosure.

FIG. 5 is a diagram 500 illustrating example communication between a UE 502 and a base station 504. At 510, UE 502 may monitor for a physical broadcast channel (PBCH), the PBCH indicating at least one of a repetition of a paging DCI or a repetition of a paging message.

At 520, base station 504 may transmit a PBCH, e.g., PBCH 524, the PBCH indicating at least one of a repetition of a paging DCI or a repetition of a paging message. At 522, UE 502 may receive the PBCH, e.g., PBCH 524, where the PBCH indicates a paging control resource set (CORESET) configuration. In some aspects, the paging CORESET configuration may implicitly indicate at least one of a repetition of the paging DCI or a repetition of the paging message. Further, the paging CORESET configuration may include one or more tables or one or more bit fields associated with the repetition of the paging DCI or the repetition of the paging message.

At 530, base station 504 may transmit remaining minimum system information (RMSI) or other system information (OSI), e.g., RMSI or OSI 534. At 532, UE 502 may receive RMSI or OSI, e.g., RMSI or OSI 534. In some aspects, the RMSI or the OSI may indicate at least one of the repetition of the paging DCI or the repetition of the paging message. Also, the RMSI or the OSI may indicate a search space for the paging PDCCH or the paging DCI.

At 540, base station 504 may encode paging DCI, where the encoded paging DCI schedules the paging message. At 550, UE 502 may monitor for a paging physical downlink control channel (PDCCH) and a paging message.

At 560, base station 504 may transmit a paging PDCCH including paging downlink control information (DCI), e.g., paging PDCCH 564, where the paging DCI may be associated with a paging message. At 562, UE 502 may receive the paging PDCCH including paging downlink control information (DCI), e.g., paging PDCCH 564, where the paging DCI is associated with the paging message. In some instances, the paging PDCCH may correspond to at least one of a paging CORESET configuration or a search space. Also, the paging DCI may be included in a paging occasion (PO).

At 570, UE 502 may decode the paging DCI, where the decoded paging DCI schedules the paging message. In some aspects, the paging DCI may indicate the repetition of the paging message. Also, the paging DCI may schedule the paging message.

At 580, base station 504 may transmit a paging message, e.g., paging message 584, where at least one of the paging DCI or the paging message is transmitted more than once. At 582, UE 502 may receive the paging message, e.g., paging message 584, where at least one of the paging DCI or the paging message is received more than once. In some aspects, repetition of the paging DCI may correspond to the paging DCI being transmitted or received more than once, and repetition of the paging message may correspond to the paging message being transmitted or received more than once. Also, at least one of the paging DCI or the paging message may be transmitted or received in one or more slots or transmitted or received via multiple monitoring occasions. Moreover, the paging message and the paging DCI may be transmitted or received in a same slot of the one or more slots.

Figure 6:
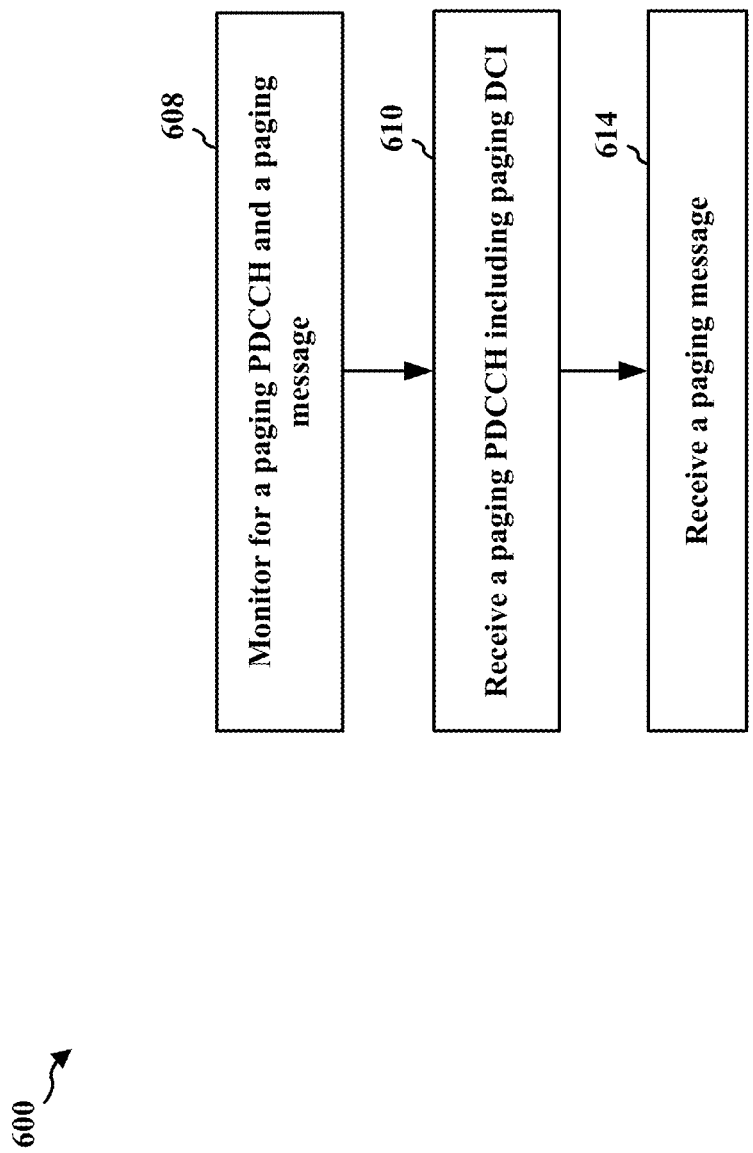
FIG. 6 is a flowchart of a method of wireless communication.

FIG. 6 is a flowchart 600 of a method of wireless communication. The method may be performed by a UE or a component of a UE (e.g., the UE 104, 350, 502; an apparatus 1002; a processing system, which may include the memory 360 and which may be the entire UE or a component of the UE, such as the TX processor 368, the controller/processor 359, transmitter 354TX, antenna(s) 352, and/or the like). The methods described herein may provide a number of benefits, such as improving communication signaling, resource utilisation, and/or power savings.

At 608, the apparatus may monitor for a paging physical downlink control channel (PDCCH) and a paging message, as described in connection with the examples in FIGS. 4 and 5. For example, UE 502 may monitor for a paging physical downlink control channel (PDCCH) and a paging message, as described in connection with 550 in FIG. 5. Further, 608 may be performed by determination component 1040 in FIG. 10.

At 610, the apparatus may receive the paging PDCCH including paging downlink control information (DCI), where the paging DCI is associated with the paging message, as described in connection with the examples in FIGS. 4 and 5. For example, UE 502 may receive the paging PDCCH including paging downlink control information (DCI), where the paging DCI is associated with the paging message, as described in connection with 562 in FIG. 5. Further, 610 may be performed by determination component 1040 in FIG. 10. In some instances, the paging PDCCH may correspond to at least one of a paging CORESET configuration or a search space, as described in connection with the examples in FIGS. 4 and 5. Also, the paging DCI may be included in a paging occasion (PO), as described in connection with the examples in FIGS. 4 and 5.

At 614, the apparatus may receive the paging message, where at least one of the paging DCI or the paging message is received more than once, as described in connection with the examples in FIGS. 4 and 5. For example, UE 502 may receive the paging message, where at least one of the paging DCI or the paging message is received more than once, as described in connection with 582 in FIG. 5. Further, 614 may be performed by determination component 1040 in FIG. 10. In some aspects, repetition of the paging DCI may correspond to the paging DCI being received more than once, and repetition of the paging message may correspond to the paging message being received more than once, as described in connection with the examples in FIGS. 4 and 5. Also, at least one of the paging DCI or the paging message may be received in one or more slots or received via multiple monitoring occasions, as described in connection with the examples in FIGS. 4 and 5. Moreover, the paging message and the paging DCI may be received in a same slot of the one or more slots, as described in connection with the examples in FIGS. 4 and 5.

Figure 7:
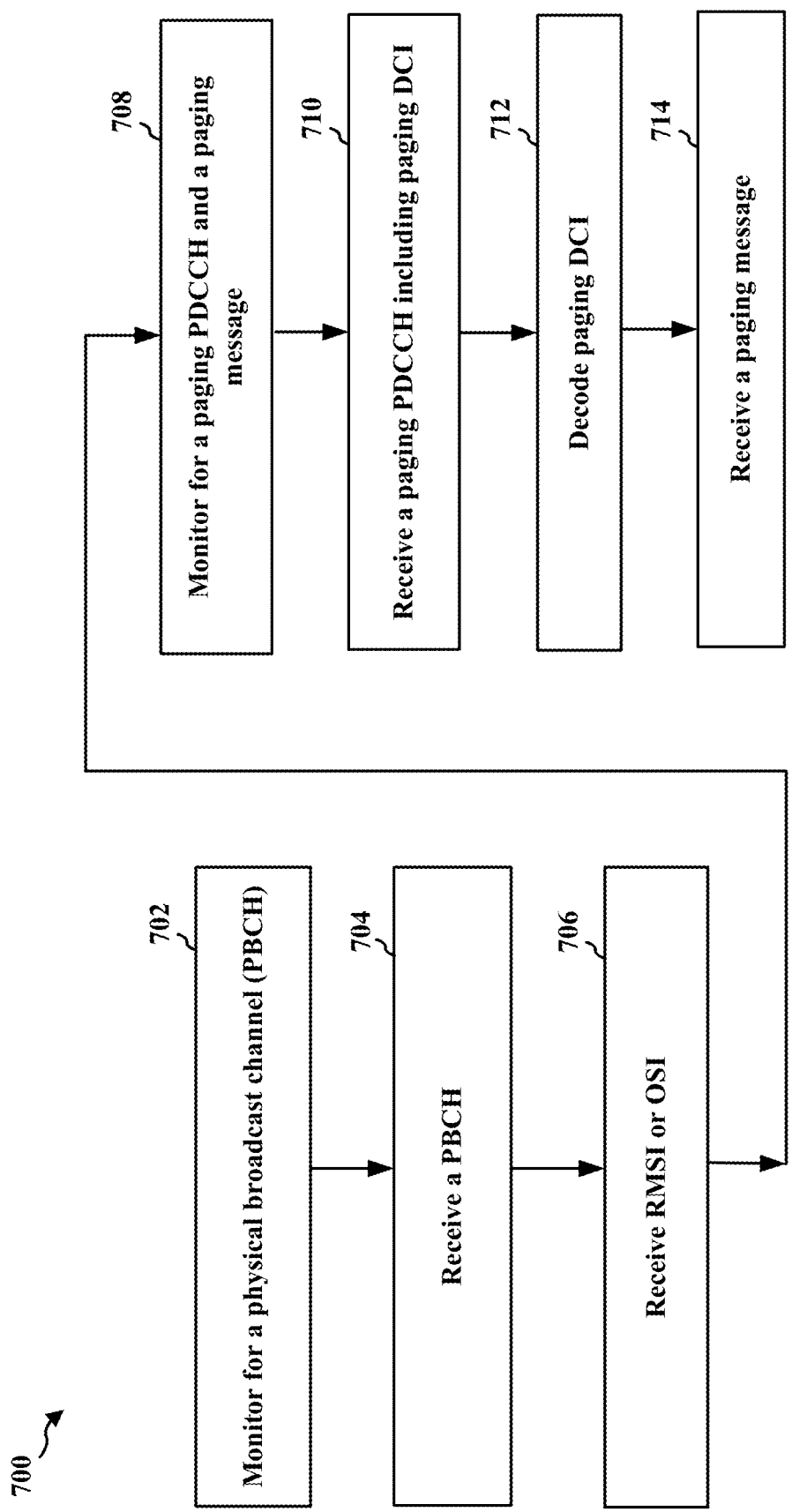
FIG. 7 is a flowchart of a method of wireless communication.

FIG. 7 is a flowchart 700 of a method of wireless communication. The method may be performed by a UE or a component of a UE (e.g., the UE 104, 350, 502; an apparatus 1002; a processing system, which may include the memory 360 and which may be the entire UE or a component of the UE, such as the TX processor 368, the controller/processor 359, transmitter 354TX antenna(s) 352, and/or the like). The methods described herein may provide a number of benefits, such as improving communication signaling, resource utilisation, and/or power savings.

At 702, the apparatus may monitor for a physical broadcast channel (PBCH), the PBCH indicating at least one of a repetition of the paging DCI or a repetition of the paging message, as described in connection with the examples in FIGS. 4 and 5. For example, UE 502 may monitor for a physical broadcast channel (PBCH), the PBCH indicating at least one of a repetition of the paging DCI or a repetition of the paging message, as described in connection with 510 in FIG. 5. Further, 702 may be performed by determination component 1040 in FIG. 10.

At 704, the apparatus may receive the PBCH, where the PBCH indicates a paging control resource set (CORESET) configuration, as described in connection with the examples in FIGS. 4 and 5. For example, UE 502 may receive the PBCH, where the PBCH indicates a paging control resource set (CORESET) configuration, as described in connection with 522 in FIG. 5. Further, 704 may be performed by determination component 1040 in FIG. 10. In some aspects, the paging CORESET configuration may implicitly indicate at least one of a repetition of the paging DCI or a repetition of the paging message, as described in connection with the examples in FIGS. 4 and 5. Further, the paging CORESET configuration may include one or more tables or one or more bit fields associated with the repetition of the paging DCI or the repetition of the paging message, as described in connection with the examples in FIGS. 4 and 5.

At 706, the apparatus may receive RMSI or OSI, as described in connection with the examples in FIGS. 4 and 5. For example, UE 502 may receive RMSI or OSI, as described in connection with 532 in FIG. 5. Further, 706 may be performed by determination component 1040 in FIG. 10. In some aspects, the RMSI or the OSI may indicate at least one of the repetition of the paging DCI or the repetition of the paging message, as described in connection with the examples in FIGS. 4 and 5. Also, the RMSI or the OSI may indicate a search space for the paging PDCCH or the paging DCI, as described in connection with the examples in FIGS. 4 and 5.

At 708, the apparatus may monitor for a paging physical downlink control channel (PDCCH) and a paging message, as described in connection with the examples in FIGS. 4 and 5. For example, UE 502 may monitor for a paging physical downlink control channel (PDCCH) and a paging message, as described in connection with 550 in FIG. 5. Further, 708 may be performed by determination component 1040 in FIG. 10.

At 710, the apparatus may receive the paging PDCCH including paging downlink control information (DCI), where the paging DCI is associated with the paging message, as described in connection with the examples in FIGS. 4 and 5. For example, UE 502 may receive the paging PDCCH including paging downlink control information (DCI), where the paging DCI is associated with the paging message, as described in connection with 562 in FIG. 5. Further, 710 may be performed by determination component 1040 in FIG. 10. In some instances, the paging PDCCH may correspond to at least one of a paging CORESET configuration or a search space, as described in connection with the examples in FIGS. 4 and 5. Also, the paging DCI may be included in a paging occasion (PO), as described in connection with the examples in FIGS. 4 and 5.

At 712, the apparatus may decode the paging DCI, where the decoded paging DCI schedules the paging message, as described in connection with the examples in FIGS. 4 and 5. For example, UE 502 may decode the paging DCI, where the decoded paging DCI schedules the paging message, as described in connection with 570 in FIG. 5. Further, 712 may be performed by determination component 1040 in FIG. 10. In some aspects, the paging DCI may indicate the repetition of the paging message, as described in connection with the examples in FIGS. 4 and 5. Also, the paging DCI may schedule the paging message, as described in connection with the examples in FIGS. 4 and 5.

At 714, the apparatus may receive the paging message, where at least one of the paging DCI or the paging message is received more than once, as described in connection with the examples in FIGS. 4 and 5. For example, UE 502 may receive the paging message, where at least one of the paging DCI or the paging message is received more than once, as described in connection with 582 in FIG. 5. Further, 714 may be performed by determination component 1040 in FIG. 10. In some aspects, repetition of the paging DCI may correspond to the paging DCI being received more than once, and repetition of the paging message may correspond to the paging message being received more than once, as described in connection with the examples in FIGS. 4 and 5. Also, at least one of the paging DCI or the paging message may be received in one or more slots or received via multiple monitoring occasions, as described in connection with the examples in FIGS. 4 and 5. Moreover, the paging message and the paging DCI may be received in a same slot of the one or more slots, as described in connection with the examples in FIGS. 4 and 5.

Figure 8:
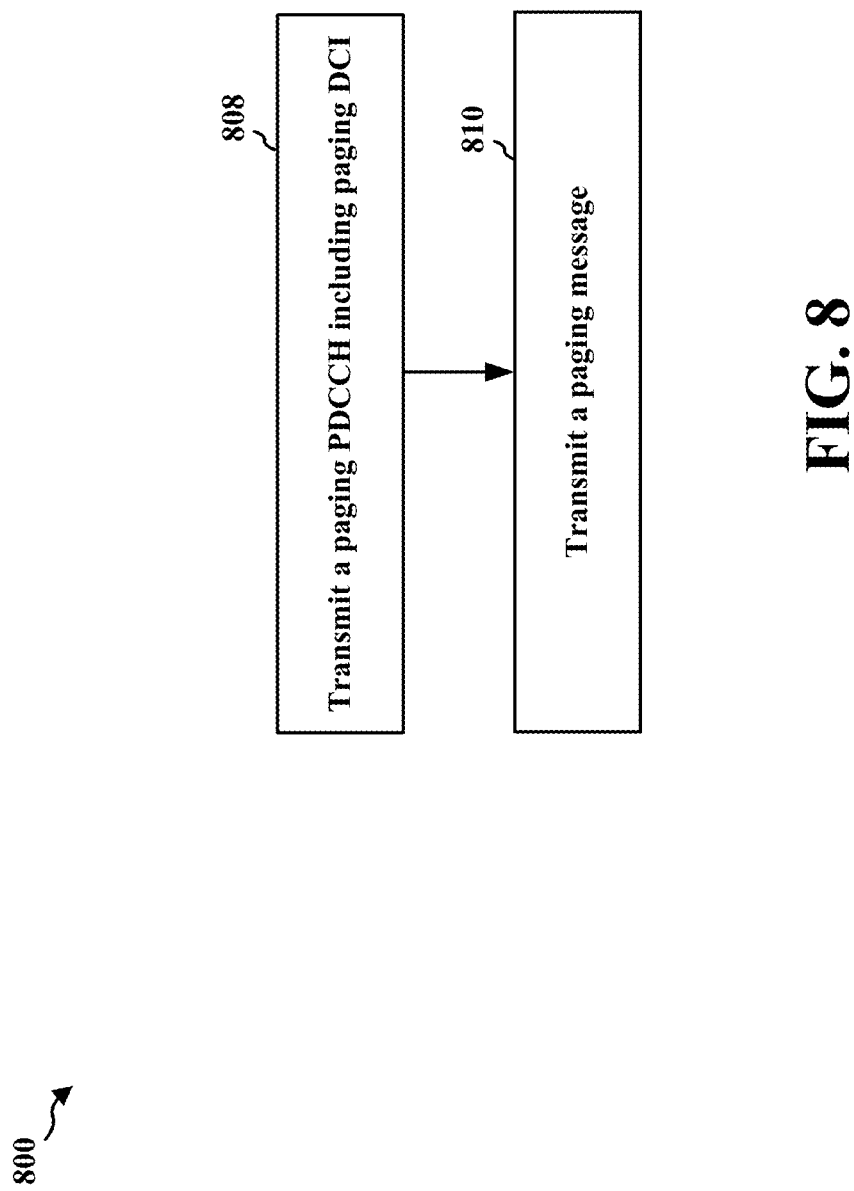
FIG. 8 is a flowchart of a method of wireless communication.

FIG. 8 is a flowchart 800 of a method of wireless communication. The method may be performed by a base station or a component of a base station (e.g., the base station 102, 180, 310, 504; an apparatus 1102; a processing system, which may include the memory 376 and which may be the entire base station or a component of the base station, such as the antenna(s) 320, receiver 318RX, the RX processor 370, the controller/processor 375, and/or the like). The methods described herein may provide a number of benefits, such as improving communication signaling, resource utilisation, and/or power savings.

At 808, the apparatus may transmit a paging PDCCH including paging downlink control information (DCI), where the paging DCI may be associated with a paging message, as described in connection with the examples in FIGS. 4 and 5. For example, base station 504 may transmit a paging PDCCH including paging downlink control information (DCI), where the paging DCI may be associated with a paging message, as described in connection with 560 in FIG. 5. Further, 808 may be performed by determination component 1140 in FIG. 11. In some instances, the paging PDCCH may correspond to at least one of a paging CORESET configuration or a search space, as described in connection with the examples in FIGS. 4 and 5. Also, the paging DCI may be included in a paging occasion (PO), as described in connection with the examples in FIGS. 4 and 5. In some aspects, the paging DCI may indicate the repetition of the paging message, as described in connection with the examples in FIGS. 4 and 5. Also, the paging DCI may schedule the paging message, as described in connection with the examples in FIGS. 4 and 5.

At 810, the apparatus may transmit a paging message, where at least one of the paging DCI or the paging message is transmitted more than once, as described in connection with the examples in FIGS. 4 and 5. For example, base station 504 may transmit a paging message, where at least one of the paging DCI or the paging message is transmitted more than once, as described in connection with 580 in FIG. 5. Further, 810 may be performed by determination component 1140 in FIG. 11. In some aspects, repetition of the paging DCI may correspond to the paging DCI being transmitted more than once, and repetition of the paging message may correspond to the paging message being transmitted more than once, as described in connection with the examples in FIGS. 4 and 5. Also, at least one of the paging DCI or the paging message may be transmitted in one or more slots or transmitted via multiple monitoring occasions, as described in connection with the examples in FIGS. 4 and 5. Moreover, the paging message and the paging DCI may be transmitted in a same slot of the one or more slots, as described in connection with the examples in FIGS. 4 and 5.

Figure 9:
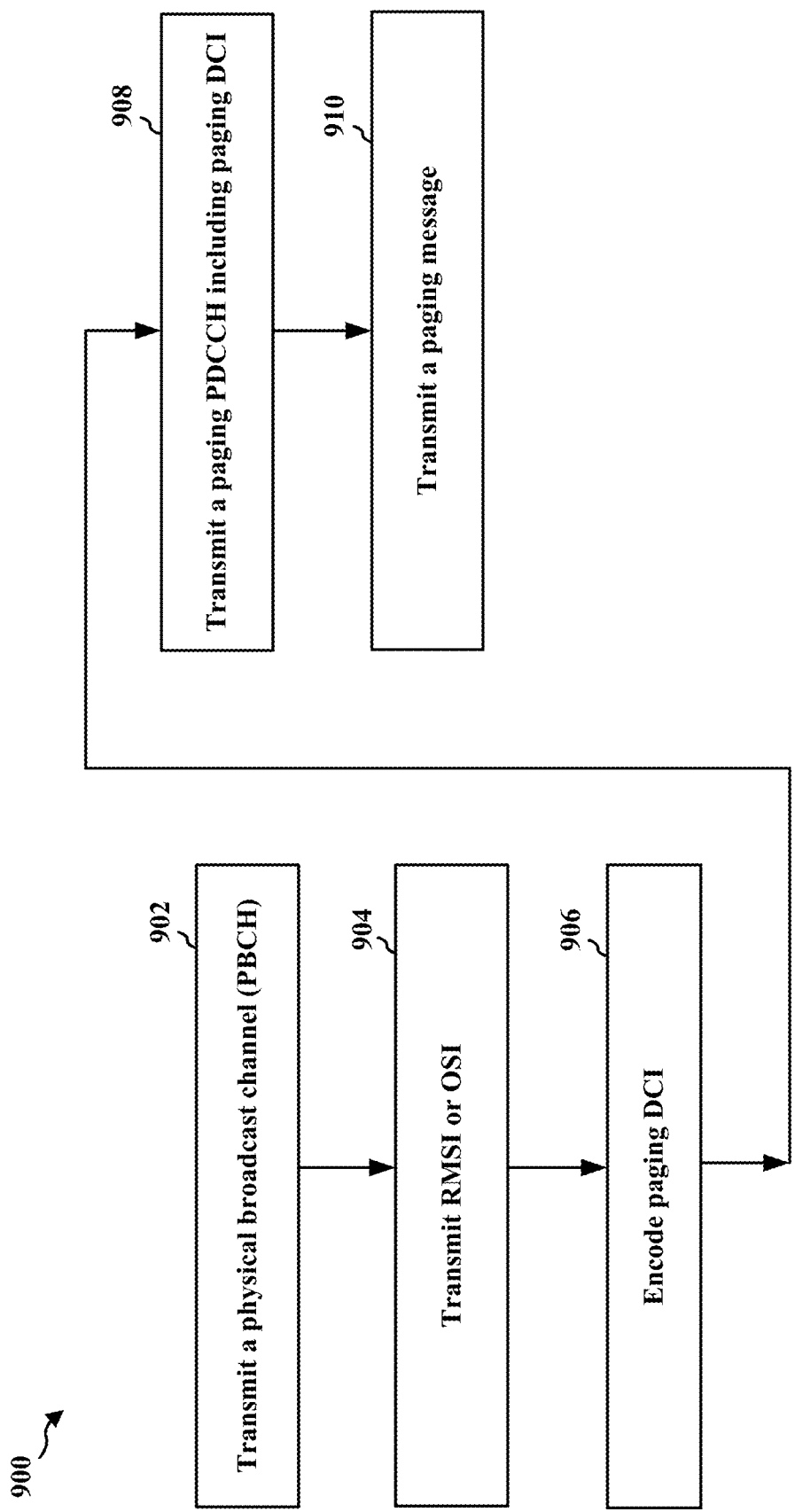
FIG. 9 is a flowchart of a method of wireless communication.

FIG. 9 is a flowchart 900 of a method of wireless communication. The method may be performed by a base station or a component of a base station (e.g., the base station 102, 180, 310, 504; an apparatus 1102; a processing system, which may include the memory 376 and which may be the entire base station or a component of the base station, such as the antenna(s) 320, receiver 318RX, the RX processor 370, the controller/processor 375, and/or the like). The methods described herein may provide a number of benefits, such as improving communication signaling, resource utilisation, and/or power savings.

At 902, the apparatus may transmit a PBCH, the PBCH indicating at least one of the repetition of the paging DCI or the repetition of the paging message, as described in connection with the examples in FIGS. 4 and 5. For example, base station 504 may transmit a PBCH, the PBCH indicating at least one of the repetition of the paging DCI or the repetition of the paging message, as described in connection with 520 in FIG. 5. Further, 902 may be performed by determination component 1140 in FIG. 11. In some aspects, the paging CORESET configuration may implicitly indicate atleast one of a repetition of the paging DCI or a repetition of the paging message, as described in connection with the examples in FIGS. 4 and 5. Further, the paging CORESET configuration may include one or more tables or one or more bit fields associated with the repetition of the paging DCI or the repetition of the paging message, as described in connection with the examples in FIGS. 4 and 5.

At 904, the apparatus may transmit remaining minimum system information (RMSI) or other system information (OSI), as described in connection with the examples in FIGS. 4 and 5. For example, base station 504 may transmit remaining minimum system information (RMSI) or other system information (OSI), as described in connection with 530 in FIG. 5. Further, 904 may be performed by determination component 1140 in FIG. 11. In some aspects, the RMSI or the OSI may indicate at least one of the repetition of the paging DCI or the repetition of the paging message, as described in connection with the examples in FIGS. 4 and 5. Also, the RMSI or the OSI may indicate a search space for the paging PDCCH or the paging DCI, as described in connection with the examples in FIGS. 4 and 5.

At 906, the apparatus may encode paging DCI, where the encoded paging DCI schedules the paging message, as described in connection with the examples in FIGS. 4 and 5. For example, base station 504 may encode paging DCI, where the encoded paging DCI schedules the paging message, as described in connection with 540 in FIG. 5. Further, 906 may be performed by determination component 1140 in FIG. 11.

At 908, the apparatus may transmit a paging PDCCH including paging downlink control information (DCI), where the paging DCI may be associated with a paging message, as described in connection with the examples in FIGS. 4 and 5. For example, base station 504 may transmit a paging PDCCH including paging downlink control information (DCI), where the paging DCI may be associated with a paging message, as described in connection with 560 in FIG. 5. Further, 908 may be performed by determination component 1140 in FIG. 11. In some instances, the paging PDCCH may correspond to at least one of a paging CORESET configuration or a search space, as described in connection with the examples in FIGS. 4 and 5. Also, the paging DCI may be included in a paging occasion (PO), as described in connection with the examples in FIGS. 4 and 5. In some aspects, the paging DCI may indicate the repetition of the paging message, as described in connection with the examples in FIGS. 4 and 5. Also, the paging DCI may schedule the paging message, as described in connection with the examples in FIGS. 4 and 5.

At 910, the apparatus may transmit a paging message, where at least one of the paging DCI or the paging message is transmitted more than once, as described in connection with the examples in FIGS. 4 and 5. For example, base station 504 may transmit a paging message, where at least one of the paging DCI or the paging message is transmitted more than once, as described in connection with 580 in FIG. 5. Further, 910 may be performed by determination component 1140 in FIG. 11. In some aspects, repetition of the paging DCI may correspond to the paging DCI being transmitted more than once, and repetition of the paging message may correspond to the paging message being transmitted more than once, as described in connection with the examples in FIGS. 4 and 5. Also, at least one of the paging DCI or the paging message may be transmitted in one or more slots or transmitted via multiple monitoring occasions, as described in connection with the examples in FIGS. 4 and 5. Moreover, the paging message and the paging DCI may be transmitted in a same slot of the one or more slots, as described in connection with the examples in FIGS. 4 and 5.

Figure 10:
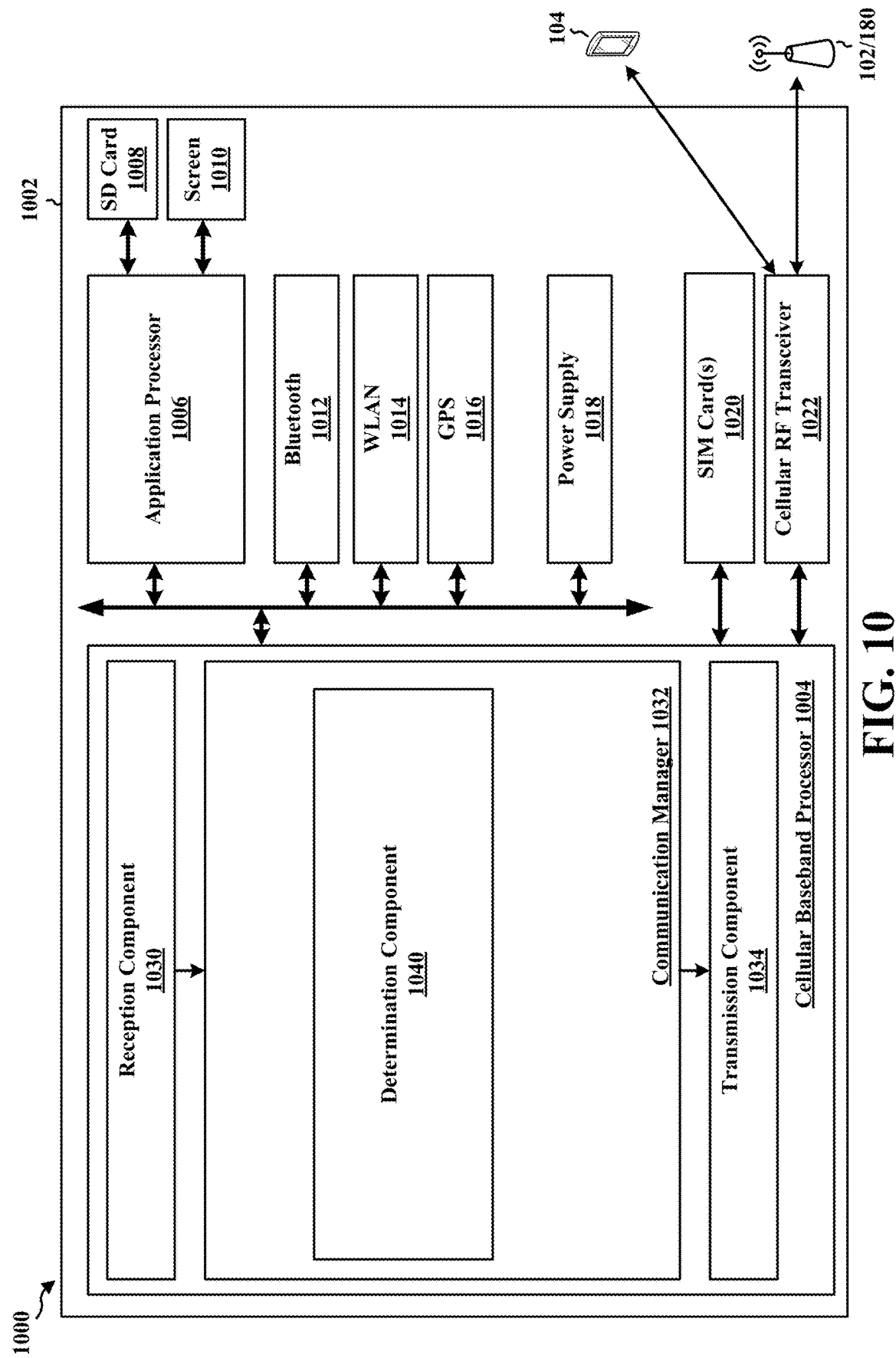
FIG. 10 is a diagram illustrating an example of a hardware implementation for an example apparatus.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the aforediscussed additional modules of the apparatus 1002.

The communication manager 1032 includes a determination component 1040 that is configured to monitor for a physical broadcast channel (PBCH), the PBCH indicating at least one of the repetition of the paging DCI or the repetition of the paging message, e.g., as described in connection with step 702 in FIG. 7. Determination component 1040 may be further configured to receive the PBCH, where the PBCH indicates a paging control resource set (CORESET) configuration, e.g., as described in connection with step 704 in FIG. 7. Determination component 1040 may be further configured to receive remaining minimum system information (RMSI) or other system information (OSI), e.g., as described in connection with step 706 in FIG. 7. Determination component 1040 may be further configured to monitor for a paging physical downlink control channel (PDCCH) and a paging message, e.g., as described in connection with step 708 in FIG. 7. Determination component 1040 may be further configured to receive the paging PDCCH including paging downlink control information (DCI), where the paging DCI is associated with the paging message, e.g., as described in connection with step 710 in FIG. 7. Determination component 1040 may be further configured to decode the paging DCI, where the decoded paging DCI schedules the paging message, e.g., as described in connection with step 712 in FIG. 7. Determination component 1040 may be further configured to receive the paging message, where at least one of the paging DCI or the paging message is received more than once, e.g., as described in connection with step 714 in FIG. 7.

The apparatus may include additional components that perform each of the blocks of the algorithm in the aforementioned flowcharts of FIGS. 5, 6, and 7. As such, each block in the aforementioned flowcharts of FIGS. 5, 6, and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for monitoring for a physical broadcast channel (PBCH), the PBCH indicating at least one of the repetition of the paging DCI or the repetition of the paging message; means for receiving the PBCH, where the PBCH indicates a paging control resource set (CORESET) configuration; means for receiving remaining minimum system information (RMSI) or other system information (OSI); means for monitoring for a paging physical downlink control channel (PDCCH) and a paging message; means for receiving the paging PDCCH including paging downlink control information (DCI), where the paging DCI is associated with the paging message; means for decoding the paging DCI, where the decoded paging DCI schedules the paging message; and means for receiving the paging message, where at least one of the paging DCI or the paging message is received more than once. The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
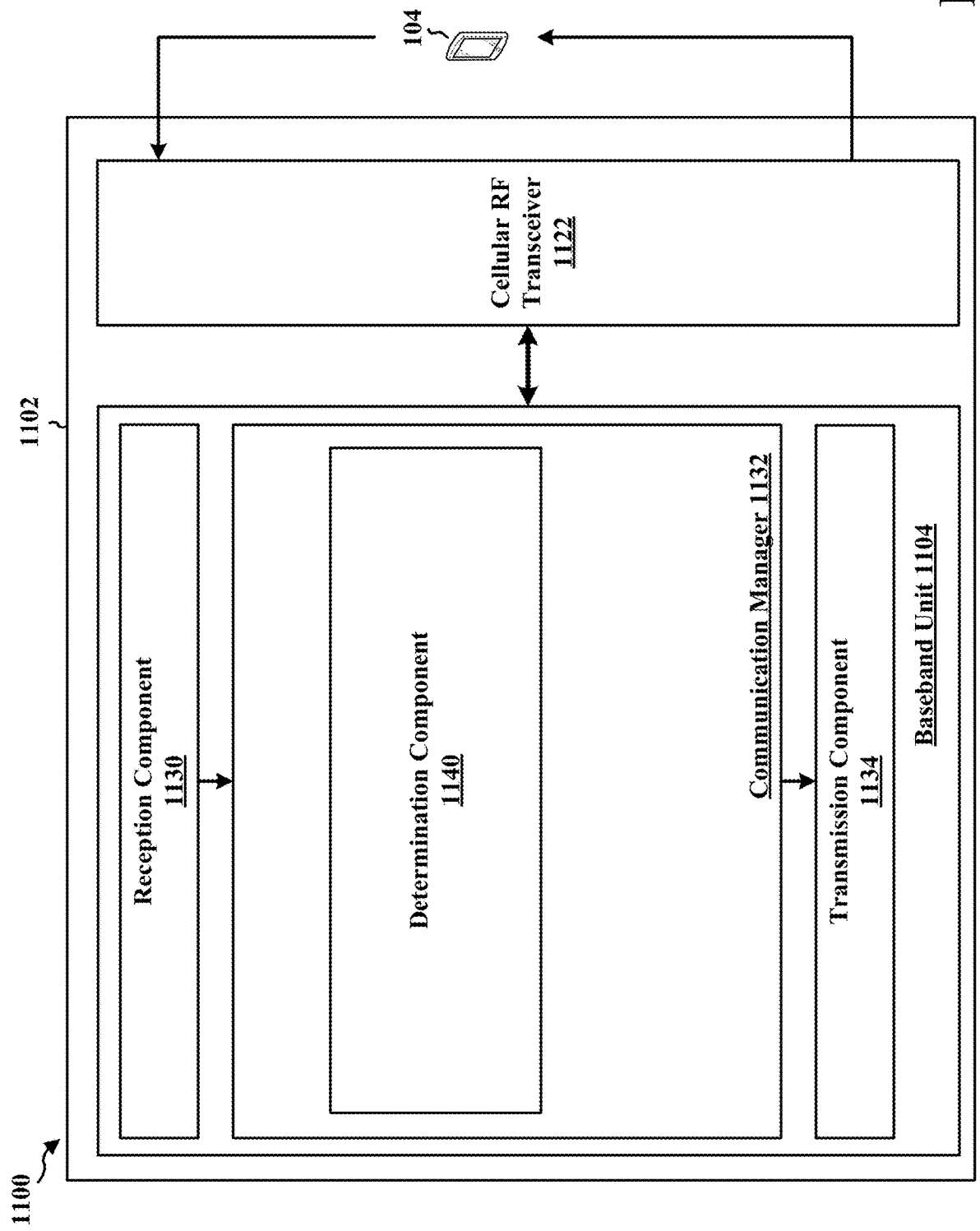
FIG. 11 is a diagram illustrating an example of a hardware implementation for an example apparatus.

FIG. 11 is a diagram 1100 illustrating an example of a hardware implementation for an apparatus 1102. The apparatus 1102 is a base station (BS) and includes a baseband unit 1104. The baseband unit 1104 may communicate through a cellular RF transceiver 1122 with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the BS 310 and may include the memory 376 and/or at least one of the TX processor 316, the RX processor 370, and the controller/processor 375.

The communication manager 1132 includes a determination component 1140 that is configured to transmit a physical broadcast channel (PBCH), the PBCH indicating at least one of the repetition of the paging DCI or the repetition of the paging message, e.g., as described in connection with step 902 in FIG. 9. Determination component 1140 may be further configured to transmit remaining minimum system information (RMSI) or other system information (OSI), e.g., as described in connection with step 904 in FIG. 9. Determination component 1140 may be further configured to encode the paging DCI, where the encoded paging DCI schedules the paging message, e.g., as described in connection with step 906 in FIG. 9. Determination component 1140 may be further configured to transmit a paging physical downlink control channel (PDCCH) including paging downlink control information (DCI), where the paging DCI is associated with a paging message, e.g., as described in connection with step 908 in FIG. 9. Determination component 1140 may be further configured to transmit the paging message, where at least one of the paging DCI or the paging message is transmitted more than once, e.g., as described in connection with step 910 in FIG. 9.

The apparatus may include additional components that perform each of the blocks of the algorithm in the aforementioned flowcharts of FIGS. 5, 8, and 9. As such, each block in the aforementioned flowcharts of FIGS. 5, 8, and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the baseband unit 1104, includes means for transmitting a physical broadcast channel (PBCH), the PBCH indicating at least one of the repetition of the paging DCI or the repetition of the paging message; means for transmitting remaining minimum system information (RMSI) or other system information (OSI); means for encoding the paging DCI, where the encoded paging DCI schedules the paging message; means for transmitting a paging physical downlink control channel (PDCCH) including paging downlink control information (DCI), where the paging DCI is associated with a paging message; and means for transmitting the paging message, where at least one of the paging DCI or the paging message is transmitted more than once. The aforementioned means may be one or more of the aforementioned components of the apparatus 1102 configured to perform the functions recited by the aforementioned means. As described supra, the apparatus 1102 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to: monitor for a paging physical downlink control channel (PDCCH) and a paging message; receive the paging PDCCH including paging downlink control information (DCI), where the paging DCI is associated with the paging message; and receive the paging message, where at least one of the paging DCI or the paging message is received more than once.

Aspect 2 is the apparatus of aspect 1, where repetition of the paging DCI corresponds to the paging DCI being received more than once, and repetition of the paging message corresponds to the paging message being received more than once.

Aspect 3 is the apparatus of any of aspects 1 and 2, where the at least one processor is further configured to: monitor for a physical broadcast channel (PBCH), the PBCH indicating at least one of the repetition of the paging DCI or the repetition of the paging message.

Aspect 4 is the apparatus of any of aspects 1 to 3, where the at least one processor is further configured to: receive the PBCH, where the PBCH indicates a paging control resource set (CORESET) configuration.

Aspect 5 is the apparatus of any of aspects 1 to 4, where the paging CORESET configuration implicitly indicates at least one of the repetition of the paging DCI or the repetition of the paging message.

Aspect 6 is the apparatus of any of aspects 1 to 5, where the paging CORESET configuration includes one or more tables or one or more bit fields associated with the repetition of the paging DCI or the repetition of the paging message.

Aspect 7 is the apparatus of any of aspects 1 to 6, where the at least one processor is further configured to: receive remaining minimum system information (RMSI) or other system information (OSI).

Aspect 8 is the apparatus of any of aspects 1 to 7, where the RMSI or the OSI indicates at least one of the repetition of the paging DCI or the repetition of the paging message.

Aspect 9 is the apparatus of any of aspects 1 to 8, where the RMSI or the OSI indicate s a search space for the paging PDCCH or the paging DCI.

Aspect 10 is the apparatus of any of aspects 1 to 9, where at least one of the paging DCI or the paging message is received in one or more slots or received via multiple monitoring occasions.

Aspect 11 is the apparatus of any of aspects 1 to 10, where the paging message and the paging DCI are received in a same slot of the one or more slots.

Aspect 12 is the apparatus of any of aspects 1 to 11, where the paging DCI indicates the repetition of the paging message.

Aspect 13 is the apparatus of any of aspects 1 to 12, where the paging DCI schedules the paging message.

Aspect 14 is the apparatus of any of aspects 1 to 13, where the at least one processor is further configured to: decode the paging DCI, where the decoded paging DCI schedules the paging message.

Aspect 15 is the apparatus of any of aspects 1 to 14, where the paging PDCCH corresponds to at least one of a paging CORESET configuration or a search space.

Aspect 16 is the apparatus of any of aspects 1 to 15, where the paging DCI is included in a paging occasion (PO).

Aspect 17 is the apparatus of any of aspects 1 to 16, further including a transceiver coupled to the at least one processor.

Aspect 18 is a method of wireless communication for implementing any of aspects 1 to 17.

Aspect 19 is an apparatus for wireless communication including means for implementing any of aspects 1 to 17.

Aspect 20 is a computer-readable medium storing computer executable code, where the code when executed by a processor causes the processor to implement any of aspects 1 to 17.

Aspect 21 is an apparatus for wireless communication at a base station including at least one processor coupled to a memory and configured to: transmit a paging physical downlink control channel (PDCCH) including paging downlink control information (DCI), where the paging DCI is associated with a paging message; and transmit the paging message, where at least one of the paging DCI or the paging message is transmitted more than once.

Aspect 22 is the apparatus of aspect 21, where repetition of the paging DCI corresponds to the paging DCI being transmitted more than once, and repetition of the paging message corresponds to the paging message being transmitted more than once.

Aspect 23 is the apparatus of any of aspects 21 and 22, where the at least one processor is further configured to: transmit a physical broadcast channel (PBCH), the PBCH indicating at least one of the repetition of the paging DCI or the repetition of the paging message.

Aspect 24 is the apparatus of any of aspects 21 to 23, where the PBCH indicates a paging control resource set (CORESET) configuration.

Aspect 25 is the apparatus of any of aspects 21 to 24, where the paging CORESET configuration implicitly indicates at least one of the repetition of the paging DCI or the repetition of the paging message.

Aspect 26 is the apparatus of any of aspects 21 to 25, where the paging CORESET configuration includes one or more tables or one or more bit fields associated with the repetition of the paging DCI or the repetition of the paging message.

Aspect 27 is the apparatus of any of aspects 21 to 26, where the at least one processor is further configured to: transmit remaining minimum system information (RMSI) or other system information (OSI).

Aspect 28 is the apparatus of any of aspects 21 to 27, where the RMSI or the OSI indicates at least one of the repetition of the paging DCI or the repetition of the paging message.

Aspect 29 is the apparatus of any of aspects 21 to 28, where the RMSI or the OSI indicates a search space for the paging PDCCH or the paging DCI.

Aspect 30 is the apparatus of any of aspects 21 to 29, where at least one of the paging DCI or the paging message is transmitted in one or more slots or transmitted via multiple monitoring occasions.

Aspect 31 is the apparatus of any of aspects 21 to 30, where the paging message and the paging DCI are transmitted in a same slot of the one or more slots.

Aspect 32 is the apparatus of any of aspects 21 to 31, where the paging DCI indicates the repetition of the paging message.

Aspect 33 is the apparatus of any of aspects 21 to 32, where the paging DCI schedules the paging message.

Aspect 34 is the apparatus of any of aspects 21 to 33, where the at least one processor is further configured to: encode the paging DCI, where the encoded paging DCI schedules the paging message.

Aspect 35 is the apparatus of any of aspects 21 to 34, where the paging PDCCH corresponds to at least one of a paging CORESET configuration or a search space.

Aspect 36 is the apparatus of any of aspects 21 to 35, where the paging DCI is included in a paging occasion (PO).

Aspect 37 is the apparatus of any of aspects 21 to 36, further including a transceiver coupled to the at least one processor.

Aspect 38 is a method of wireless communication for implementing any of aspects 21 to 37.

Aspect 39 is an apparatus for wireless communication including means for implementing any of aspects 21 to 37.

Aspect 40 is a computer-readable medium storing computer executable code, where the code when executed by a processor causes the processor to implement any of aspects 21 to 37.

What is claimed is:

1. An apparatus for wireless communication at a user equipment (UE), comprising:
   memory; and
   at least one processor coupled to the memory and configured to:
   monitor for a paging physical downlink control channel (PDCCH) and a paging message;
   receive the paging PDCCH including paging downlink control information (DCI), wherein the paging DCI is associated with the paging message;
   receive a physical broadcast channel (PBCH), wherein the PBCH indicates a paging control resource set (CORESET) configuration, wherein the paging CORESET configuration includes one or more tables or one or more bit fields associated with a repetition of the paging DCI or a repetition of the paging message, and wherein the one or more tables or the one or more bit fields implicitly indicates at least one of the repetition of the paging DCI or the repetition of the paging message; and
   receive the paging message, wherein to receive the paging DCI and the paging message, the at least one processor is configured to receive the paging DCI and the paging message more than once within one paging occasion.

2. The apparatus of claim 1, wherein repetition of the paging DCI corresponds to the paging DCI being received more than once, and repetition of the paging message corresponds to the paging message being received more than once.

3. The apparatus of claim 2, wherein the at least one processor is further configured to:
   receive remaining minimum system information (RMSI) or other system information (OSI).

4. The apparatus of claim 3, wherein the RMSI or the OSI indicates at least one of the repetition of the paging DCI or the repetition of the paging message.

5. The apparatus of claim 3, wherein the RMSI or the OSI indicates a search space for the paging PDCCH or the paging DCI.

6. The apparatus of claim 2, wherein the paging DCI indicates the repetition of the paging message.

7. The apparatus of claim 1, wherein to receive the paging message and the paging DCI, the at least one processor is configured to receive the paging message and the paging DCI in a same slot.

8. The apparatus of claim 1, wherein the paging DCI schedules the paging message.

9. The apparatus of claim 8, wherein the at least one processor is further configured to:
   decode the paging DCI, wherein the decoded paging DCI schedules the paging message.

10. The apparatus of claim 1, wherein the paging PDCCH corresponds to at least one of a paging CORESET configuration or a search space.

11. The apparatus of claim 1, further comprising a transceiver coupled to the at least one processor.

12. A method of wireless communication performed by a user equipment (UE), comprising:
   monitoring for a paging physical downlink control channel (PDCCH) and a paging message;
   receiving the paging PDCCH including paging downlink control information (DCI), wherein the paging DCI is associated with the paging message;
   receiving a physical broadcast channel (PBCH), wherein the PBCH indicates a paging control resource set (CORESET) configuration, wherein the paging CORE- SET configuration includes one or more tables or one or more bit fields associated with a repetition of the paging DCI or a repetition of the paging message, and wherein the one or more tables or the one or more bit fields implicitly indicates at least one of the repetition of the paging DCI or the repetition of the paging message; and receiving the paging message, wherein the paging DCI and the paging message are received more than once within one paging occasion.

13. An apparatus for wireless communication at a base station, comprising:

memory; and at least one processor coupled to the memory and configured to:

transmit a paging physical downlink control channel (PDCCH) including paging downlink control information (DCI), wherein the paging DCI is associated with a paging message;

transmit a physical broadcast channel (PBCH), wherein the PBCH indicates a paging control resource set (CORESET) configuration, wherein the paging CORESET configuration includes one or more tables or one or more bit fields associated with a repetition of the paging DCI or a repetition of the paging message, and wherein the one or more tables or the one or more bit fields implicitly indicates at least one of the repetition of the paging DCI or the repetition of the paging message; and transmit the paging message, wherein to transmit the paging DCI and the paging message, the at least one processor is configured to transmit the paging DCI and the paging message more than once within one paging occasion.

14. The apparatus of claim 13, wherein repetition of the paging DCI corresponds to the paging DCI being transmitted more than once, and repetition of the paging message corresponds to the paging message being transmitted more than once.

15. The apparatus of claim 14, wherein the at least one processor is further configured to:

transmit remaining minimum system information (RMSI) or other system information (OSI).

16. The apparatus of claim 15, wherein the RMSI or the OSI indicates at least one of the repetition of the paging DCI or the repetition of the paging message.

17. The apparatus of claim 15, wherein the RMSI or the OSI indicates a search space for the paging PDCCH or the paging DCI.

18. The apparatus of claim 14, wherein the paging DCI indicates the repetition of the paging message.

19. The apparatus of claim 13, wherein to transmit the paging message and the paging DCI, the at least one processor is configured to transmit the paging message and the paging DCI in a same slot.

20. The apparatus of claim 13, wherein the at least one processor is further configured to:

encode the paging DCI, wherein the encoded paging DCI schedules the paging message.

21. The apparatus of claim 13, wherein the paging PDCCH corresponds to at least one of a paging CORESET configuration or a search space.

22. The apparatus of claim 13, further comprising a transceiver coupled to the at least one processor.

23. A method of wireless communication performed by a base station, comprising:

transmitting a paging physical downlink control channel (PDCCH) including paging downlink control information (DCI), wherein the paging DCI is associated with a paging message;

transmitting a physical broadcast channel (PBCH), wherein the PBCH indicates a paging control resource set (CORESET) configuration, wherein the paging CORESET configuration includes one or more tables or one or more bit fields associated with a repetition of the paging DCI or a repetition of the paging message, and wherein the one or more tables or the one or more bit fields implicitly indicates at least one of the repetition of the paging DCI or the repetition of the paging message; and transmitting the paging message, wherein the paging DCI and the paging message are transmitted more than once within one paging occasion.

* * * * *